United States Patent
Kowalczyk

[19]

[11] Patent Number: 6,039,368
[45] Date of Patent: Mar. 21, 2000

[54] READILY CLEANABLE LITTER CLEANING SYSTEM

[76] Inventor: Karen Kowalczyk, 1405 Severn Ct., Naperville, Ill. 60565

[21] Appl. No.: 09/018,972

[22] Filed: Feb. 5, 1998

[51] Int. Cl.[7] .............................. A01K 29/00; E01H 1/12
[52] U.S. Cl. .............................. 294/1.3; 119/161; 294/55
[58] Field of Search .............................. 294/1.3, 1.4, 1.5, 294/49, 55, 131; 15/104.8, 257.1, 257.2, 257.6, 257.7; 119/161, 166; 206/223, 229; 209/417–419; 220/735

[56] References Cited

U.S. PATENT DOCUMENTS

| D. 262,943 | 2/1982 | Schädler . | |
|---|---|---|---|
| D. 310,436 | 9/1990 | Krauth | 294/1.3 X |
| D. 314,254 | 1/1991 | Gordon . | |
| 1,283,403 | 10/1918 | Eustis . | |
| 3,796,453 | 3/1974 | Grimes | 294/1.3 |
| 4,226,456 | 10/1980 | Barnett . | |
| 5,190,326 | 3/1993 | Nunn . | |
| 5,259,406 | 11/1993 | Hofmann . | |
| 5,382,063 | 1/1995 | Wesener et al. . | |
| 5,577,462 | 11/1996 | Korth . | |
| 5,775,258 | 7/1998 | Larsen et al. | 294/1.3 X |
| 5,855,186 | 1/1999 | Larsen et al. | 294/1.3 X |

FOREIGN PATENT DOCUMENTS

| 672873 | 1/1990 | Switzerland | 294/1.3 |

Primary Examiner—Johnny D. Cherry
Attorney, Agent, or Firm—Welsh & Katz, Ltd.

[57] ABSTRACT

A readily cleanable litter cleaning system for removing fecal matter from a litter box includes a container having substantially identical front and rear panels joined by substantially identical side panels and a bottom panel. The container has a rectangular cross-section defining an open top and a liquid storage region. The container has a predetermined width along the front and rear panels and a predetermined depth along the side panels. The container includes at least one projection extending from at least one of the panels into the liquid storage region. The projection terminates in an end in spaced relation from the bottom panel. A top cover is tightly fitted to the container and seals the container open top. The cover defines an opening therein. A scoop for removing the fecal matter from the litter has a blade portion and an elongated handle. The blade portion has a width configured for placement in the container generally parallel to the front and rear panels and for fitting between the side panels. The blade portion is further configured for fitting in the container with the blade resting on the container projections, in spaced relation to the bottom. The scoop handle is configured for extending through the cover opening when the cover is in place on the container to permit manipulating the scoop blade in the liquid in the container.

9 Claims, 3 Drawing Sheets

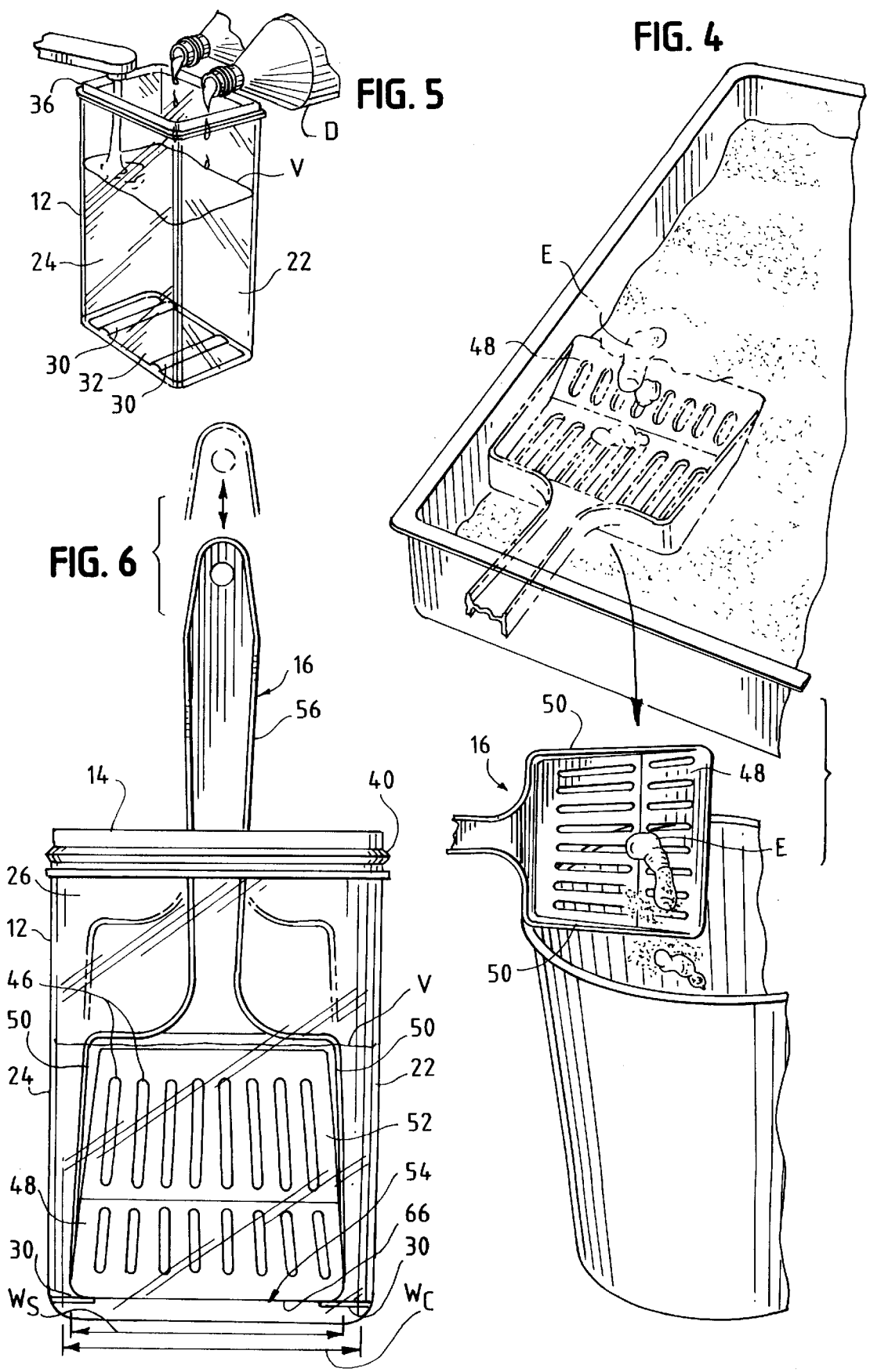

READILY CLEANABLE LITTER CLEANING SYSTEM

FIELD OF THE INVENTION

This invention pertains to a litter cleaning system. More particularly, the invention pertains to a readily cleanable litter cleaning system including a cleaning scoop and a container therefor.

BACKGROUND OF THE INVENTION

The urbanization and suburbanization of society has prompted pet owners to train their pets to perform their bodily functions, i.e., excrete, in containers such as litter boxes. As most pet owners will recognize, the advancements in litter technology now permit prolonged use of a single batch or load of litter without the odors typically associated with a used litter box.

In order to maintain the litter box odor-free and visually acceptable, it is necessary to clean the litter box frequently, perhaps even after each use. Many devices have been developed to facilitate cleaning litter boxes. Some devices, such as a slotted scoop are rather simple, while other devices such as screens positioned within boxes are relatively complex. Some of the more complex devices include reversible or rotatable litter boxes having an intermediate scoop/screen positioned between upper and lower box halves, as well as scooping devices that include hinged, spring-loaded doors through which the scooped excrement can be disposed of.

Although these devices may function well for their intended purpose, they can be rather complex and may include numerous moving parts that do not lend themselves to inexpensive, mass produced, consumer goods manufacture. Moreover, such devices can break or may become so fouled that they must be disposed of.

Another problem that is encountered with such devices is that they do not readily lend themselves to being cleaned. That is, often it is necessary to remove the scooping portion or other portions that may come into contact with excrement, and flush or wash these portions of the device in a sink in order to clean the device thoroughly. Such cleaning tasks can become rather unpleasant.

Accordingly, there continues to be a need for a readily cleanable litter cleaning system. Such a system incorporates relatively simple and cost-effective parts that are readily cleaned. Such a system further isolates or encloses that portion of the system that comes into contact with the animal's excrement that is cleaned from the litter.

SUMMARY OF THE INVENTION

A readily cleanable litter cleaning system for removing fecal matter from a litter box includes generally a container having a fitted cover with an opening in the cover, and a scoop having an elongated handle for traversing through the cover opening. The container has substantially identical front and rear panels joined by substantially identical side panels and a bottom panel. The container has a rectangular cross-section defining an open top and a liquid storage region. The container sides define a predetermined width along the front and rear panels and a predetermined depth along the side panels. In a preferred embodiment, the container is formed from a transparent plastic material.

The container includes at least one projection extending from at least one of the panels into the liquid storage region. The projection terminates in an end that is in spaced relation from the bottom panel.

The top cover is configured for tightly fitting to the container and sealing the container at the open top.

The scoop for removing the fecal matter from the litter has a blade portion and an elongated handle. The blade portion has a width configured for placement in the container generally parallel to the front and rear panels and for fitting between the side panels. The blade portion is further configured for fitting in the container with the blade resting on the container projections, in spaced relation to the bottom.

The container is filled with a quantity of liquid, such as water, and the scoop is placed in the container, with the handle extending through the cover opening. The scoop is cleanable by vigorously moving the scoop through the liquid in the container.

In one embodiment, the container includes a longitudinal partition wall dividing the liquid storage region into two independent and separate storage regions. The partition wall extends between the side panels, parallel to the front and rear panels, and is configured so as to not interfere with positioning the scoop in the container in a vertical orientation.

The container can include a chemical dispensing chamber disposed in the container. The dispensing chamber is formed from a rigid, partially open material to provide flow communication with the container storage region.

In a preferred embodiment, the cover includes a gasket at the opening, and the scoop handle is positionable through the gasket. The cover can include a second opening independent of the opening formed in the cover for the scoop handle. The second opening can be used to add materials, such as chemical disinfectants to the liquid in the container, or to discharge liquids from the container. The cover can include a closure for sealing the second opening.

In a most preferred embodiment, the container includes a handle positioned on the container to facilitate handling, emptying, cleaning and filling the container.

Other features and advantages of the present invention will be apparent from the following detailed description, the accompanying drawings, and the appended claims.

BRIEF DESCRIPTION OF THE FIGURES

FIG. 4 is an illustration of use of the system, with the scoop shown removing fecal matter from an exemplary litter box, and one contemplated, subsequent method for disposing of the fecal matter;

FIG. 5 is a perspective view of the system container being filled with liquid, and illustrated with an exemplary liquid disinfectant being added to the liquid;

FIG. 6 is a side view of the system of FIG. 1, with the cover removed for clarity of illustration, and with the scoop being moved up and down through the liquid to clean the scoop;

DETAILED DESCRIPTION OF THE PREFERRED EMBODIMENTS

Figure 1:
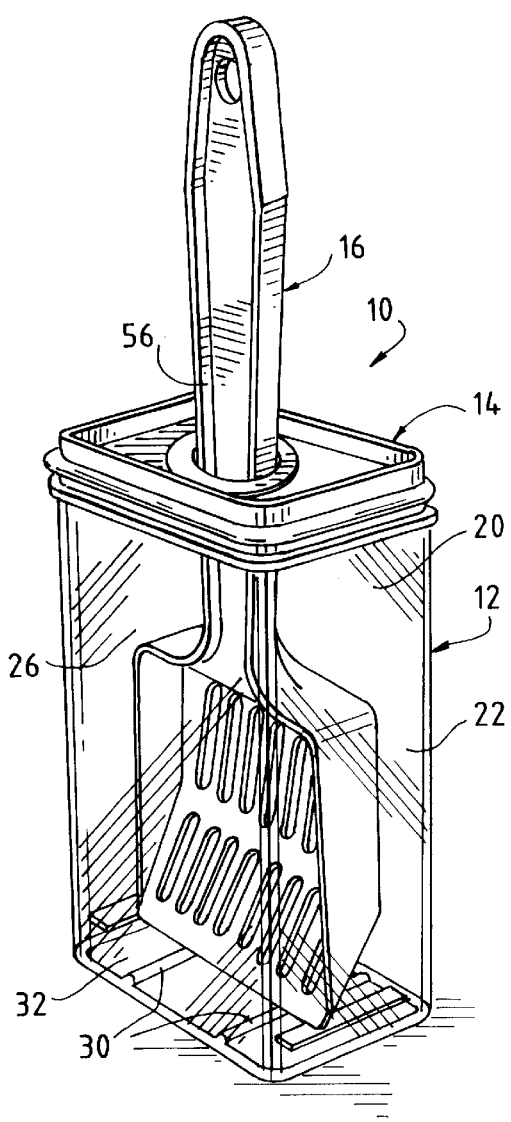
FIG. 1 is a perspective view of an embodiment of a readily cleanable litter cleaning system, with the cover engaged with the container, in accordance with the principles of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 7:
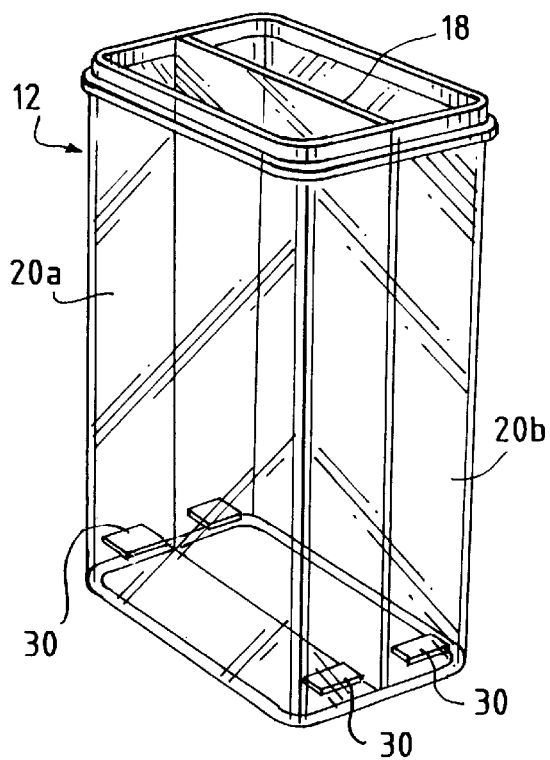
FIG. 7 is a perspective view of an alternate configuration of the container shown with a partition wall forming two separate and distinct storage regions.

Referring now to the figures, and in particular to FIG. 1, there is shown a readily cleanable litter cleaning system 10 that embodies the principles of the present invention. The litter cleaning system 10 includes generally, a container 12, a cover 14 for the container 12, and a slotted scoop 16. The container 12 is preferably rectangular in shape and in cross-section, and formed from a transparent plastic or polymeric material, so that as the scoop 16 is cleaned, it is readily apparent from viewing through the sides of the container 12, that the excrement E has been fully removed from the scoop 16. Alternately, as illustrated in FIG. 7, the container 12 can be formed with a longitudinal partition wall 18 that divides the liquid storage region 20 into two independent and segregated regions 20a,b. In a preferred embodiment, the partition wall 18 is positioned extending between the side panels 22, 24, parallel to the front and rear panels, 26, 28.

Figure 2:
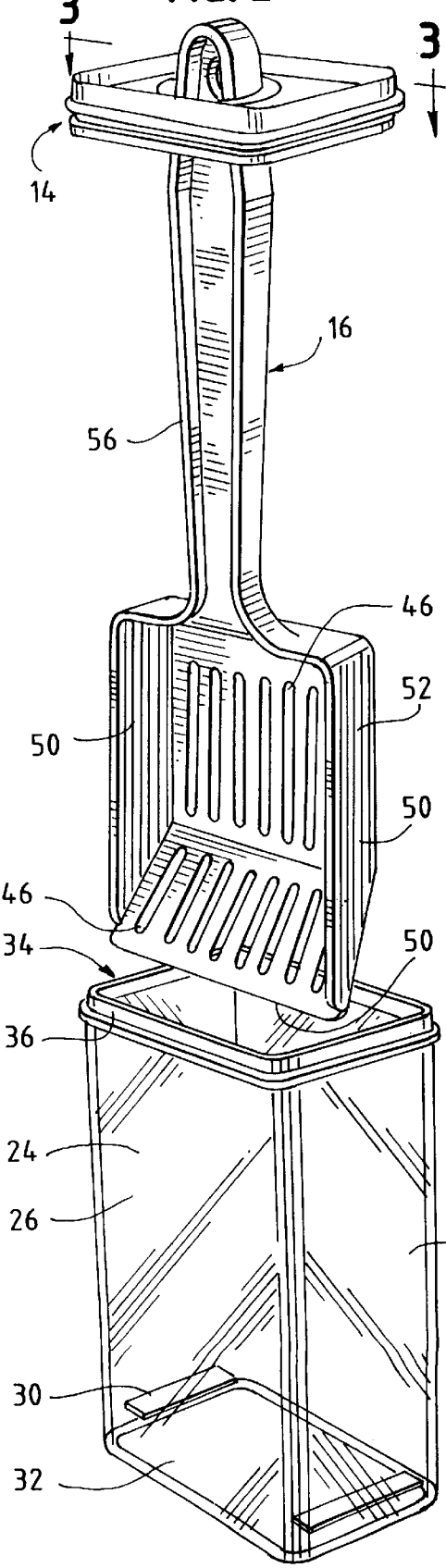
FIG. 2 is a perspective view of the system of FIG. 1, illustrated with the cover removed from the container and the scoop handle partially removed from the cover.
Figure 3:
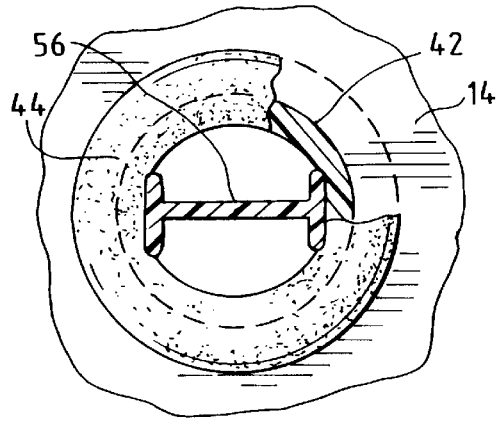
FIG. 3 is a partially-broken away view, also in partial cross-section, of the opening in the cover with the scoop handle inserted through the opening, illustrating a gasket or grommet positioned in the opening.

In a preferred embodiment, the container 12 includes one or more rests or ribs 30 that extend outwardly from the side walls 22, 24 thereof (as seen in FIG. 2), or alternately that extend upwardly from the bottom 32 of the container 12 (as seen in FIG. 1), the function of which will be described in more detail herein.

Figure 9:
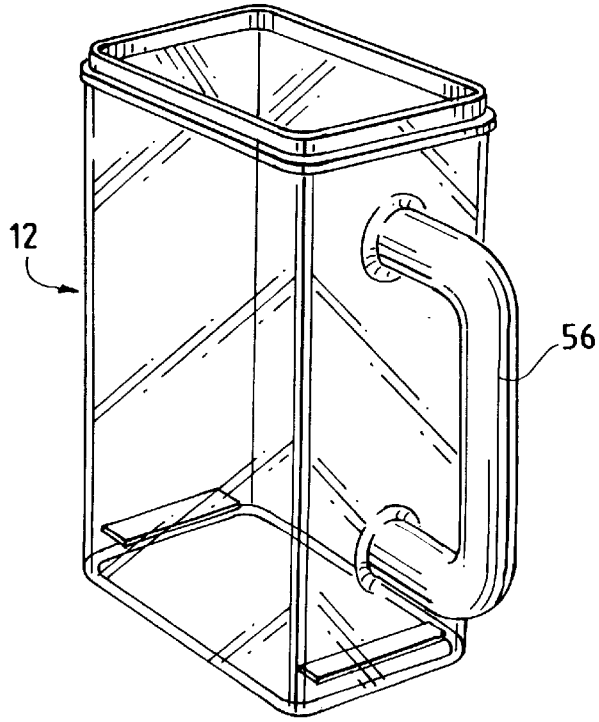
FIG. 9 is a perspective view of the container shown with a handle.

The top rim 34 of the container 12 is formed with an outwardly rolled or oriented lip, as indicated at 36, best seen in FIGS. 2 and 6. The lip 36 so formed precludes the accumulation of liquid, and thus the possibility of accumulating fecal matter E, within the container 12 as the container 12 is emptied. As will be apparent from the drawings, the outwardly formed lip 36 facilitates emptying and cleaning the container 12. As seen in FIG. 9, the container 12 can include a handle 56 to facilitate handling, filling and emptying the container 12.

A lid or top cover 14 is configured for tightly fitting to the container 12. In a preferred embodiment, the lid 14 fits sufficiently tightly to the container 12 to establish and maintain a seal along the area at which the lid 14 engages the container as indicated at 40. The lid 14 includes an opening 42 therein having a predetermined size. A grommet or gasket 44, preferably formed of a resilient material, such as rubber, can be positioned at the opening 42.

The rubber gasket 44 serves to, among other things, cover the edges of the opening 42 in the lid 14. The gasket 44 further prevents the lid 14 from splitting along lines that may be formed by imperfections in the lid opening 42, and also covers any rough edges that may be formed in the opening 42 as a result of the manufacturing process. In addition, the gasket 44 forms a partial seal around or reduces the size of the opening 42 in the cover 14 when, as will be discussed below, a scoop 16 handle is positioned therethrough.

This system includes a scoop 16. Preferably the scoop 16 is slotted as indicated at 46 so that as excrement E is scooped from the litter L, the litter L will fall through the slots 46 in the scoop 16 and the excrement E will be retained on the scoop 16. Most preferably, the scoop 16 includes an angled blade edge portion 48 and walls 50 disposed along the blade 52 to provide greater assurance that excrement E remains on the scoop 16 and does not inadvertently fall therefrom. In a most preferred arrangement, the scoop blade 52 is widest at the end, as indicated at 54, and tapers slightly inwardly as the blade 52 joins the handle 56.

As can be seen from the drawings, and particularly FIGS. 1, 2 and 6, the scoop handle 56 is elongated. The handle 56 is configured so that when the system 10 is assembled with the scoop 16 in the container 12 and the lid 14 on the container 12, the handle 56 will extend through the opening 42 in the lid 14 a distance sufficient for a user to grasp the handle 56 and manipulate the scoop 16 within the container 12. In a most preferred embodiment, the scoop 16 has a width $W_S$ that is slightly less than the width $W_C$ of the container 12. In this arrangement, the scoop 16 can be moved back and forth and can be moved slightly from side to side, within the container 12 to, as will be discussed in greater detail herein, clean the scoop 16.

Most preferably, the ribs 30 that extend inwardly from the sides 22, 24 of the container 12 or upwardly from the bottom 32 of the container 12 are configured so that the scoop 16 can rest on the ribs 30 and does not rest on the bottom 32 of the container 12. In the embodiment of the container 12 illustrated in FIG. 7, in which the container 12 includes a longitudinal partition wall 18, the opening 42 in the cover 14 for accommodating the scoop handle 56 can be offset from the center of the cover 14, toward either the front or rear panel 26, 28, so that the scoop 16 essentially lies vertical in the container 12, without the partition wall 18 interfering with positioning the scoop 16 in the container 12.

In the embodiment of the cleaning system illustrated in FIG. 8, the container 12 includes a chemical dispensing chamber 58 positioned in the container 12, at or in part below the contemplated liquid level V. The chamber 58 includes a screened or partially opened housing 60 through which liquid can pass and can contact, for example, a tablet T or like dosage of a chemical disinfectant stored in the chamber 58. The chamber can include a cover (not shown) to enclose the chemical within the chamber 58 and to prevent the exemplary chemical tablet T from falling out of the chamber 58.

Figure 8:
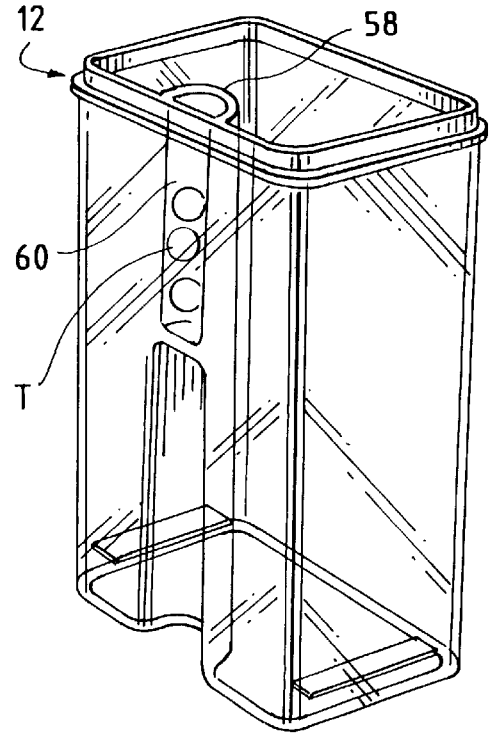
FIG. 8 is still another alternate configuration of the container shown with a dispensing chamber formed in a wall of the container, and illustrated with disinfectant tablets in the chamber.

The chamber 58 can be formed as part of the container 12, as seen in FIG. 8, or it can be a separate element (not shown) that is affixed to the container 12, such as by mechanical clips, adhesives or through other methods for adhering plastics and the like to one another, which other methods will be recognized by those skilled in the art.

Figure 10:
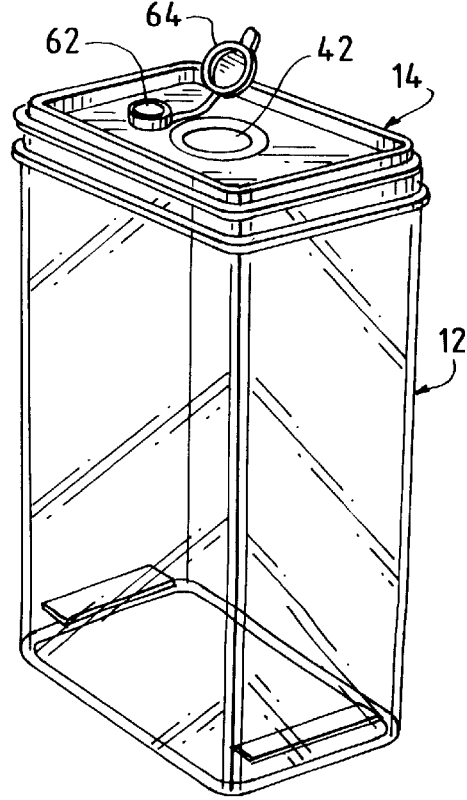
FIG. 10 is a perspective view of an embodiment of the present readily cleanable litter cleaning system, shown with an alternate embodiment of the system cover having a second opening therein for the addition or removal of liquids form the container.

As seen in FIG. 10, the container cover 14 can also include a second opening, such as the illustrated opening 62, that can be used to add liquids and the like to the container 12 and to pour or discard liquids therefrom. Preferably, the second opening 62 includes a closure, such as the illustrated sealable closure 64 to provide a relatively liquid tight seal for the second opening 62. The second opening 62 can be positioned immediately above the dispensing chamber 58 so that chemicals, such as the exemplary disinfectant tablet T, can be placed into the container without opening the container cover 14.

In use, the container 12 is filled to between about ⅓ and ⅔ of the volume of the storage region 20 with water. A small amount of a disinfectant, such as household bleach, or a tablet T form of disinfectant can be added to the water through, for example, the second opening 62. The scoop 16 is then used to remove the excrement E from the litter L in the litter box. In removing the excrement E, the slots 46 in the blade 52 facilitate separating the fecal matter E from the litter L, and permit the litter L to fall back into the box.

It should be noted that the scoop 16 can be used with the scoop handle 56 positioned through the opening 42 in the cover 14 or the scoop 16 can be used with the handle 56 completely separate from the container 12 and cover 14. When using the scoop 16 with the cover 14 positioned on the handle 56, the cover 14 serves as a hilt or guard. In this configuration, the cover 14 prevents the fecal matter E from contacting the user's fingers or hand.

The fecal matter E that is resting on the blade 52 can then be placed into the water in the container 12 along with the scoop 16, and the container 12 sealed with the cover 14 having the scoop handle 56 extending through the opening 42. The relationship between the width W, of the scoop blade 52 and the width $W_C$ of the container 12 is such that the scoop 16 can be swirled or moved vigorously through the water to remove all of the fecal matter E from the blade 52. Because of the tight fit between the scoop handle 56 and the opening 42, liquid will remain in the container 12 and should not splash or spill out through the opening 42.

Once the scoop 16 is completely rinsed or cleaned-off, the cover 14 is removed from the container 12 and the liquid along with any fecal matter E can be disposed of in an environmentally safe and friendly manner. After the container 12 has been emptied, it can be rinsed out, the scoop 16 can be placed back into the container 12, and the cover 14 can be affixed in place on the container 12. Alternately, after the fecal matter E is separated and removed from the litter L, it can be disposed of, and the scoop 16 can be cleaned by placing it in the container 12 with the liquid, positioning the cover 14 on the container 12, and vigorously moving, e.g., manipulating, the scoop 16 through the liquid.

As discussed above, the container 12 includes ribs 30 that extend outwardly from the sides 22, 24 or alternately upwardly from the bottom 32 of the container 12. The ribs 30 are configured so that the edge of the scoop as indicated at 66, will rest on the ribs 30 above the bottom 32 of the container 12. This assures that the scoop 16 will more efficiently dry, and that the scoop 16 will remain above and out of contact with any liquid that may remain in the container 12 after it is emptied.

The present system 10 provides a readily cleanable litter cleaning system that permits cleaning a litter box in a safe and effective manner. Advantageously, the present system 10 is self-storing. That is, after use, the litter scoop 16 can be placed into the container12 and the cover 14 can be placed on the container 12. The system 10 can then be stored, for example, under a sink or in a garage, so that otherwise unsightly litter cleaning implements are not in plain view.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A readily cleanable litter cleaning system for removing fecal matter from a litter box, the cleaning system, comprising:

a container having substantially identical front and rear panels joined by substantially identical side panels and a bottom panel, the container having a rectangular cross-section defining an open top and a liquid storage region, the container having a predetermined width along the front and rear panels and a predetermined depth along the side panels, the front, rear and side panels terminating in an upper rim;

at least one projection extending from at least one of the panels into the liquid storage region, the projection terminating in an end in spaced relation from the bottom panel;

a top cover configured for tightly fitting to the container and sealing the container front, rear and side panels at the open top, the cover defining sides and further defining an opening therein in spaced relation to the sides; and a scoop for removing the fecal matter from the litter, the scoop having a blade portion and an elongated handle, the blade portion having a width configured for placement in the container generally parallel to the front and rear panels and fitting between the side panels, the blade portion further configured for fitting in the container with the blade resting on the at least one container projection, in spaced relation to the bottom, wherein the container is filled with a quantity of liquid and the scoop is placed in the container and is cleanable by vigorously moving the scoop through the liquid in the container.

2. The readily cleanable litter cleaning system in accordance with claim 1 wherein the container includes a longitudinal partition wall dividing the liquid storage region into two independent and separated storage regions.

3. The readily cleanable litter cleaning system in accordance with claim 1 including a chemical dispensing chamber disposed in the container.

4. The readily cleanable litter cleaning system in accordance with claim 3 wherein the dispensing chamber is formed from a rigid, partially open material to provide flow communication with the container storage region.

5. The readily cleanable litter cleaning system in accordance with claim 1 wherein the cover includes a gasket at the opening, and wherein the scoop handle is positionable through the gasket.

6. The readily cleanable litter cleaning system in accordance with claim 1 wherein the cover includes a second opening independent of the opening formed in the cover for the scoop handle.

7. The readily cleanable litter cleaning system in accordance with claim 6 including a closure for sealing the second opening.

8. The readily cleanable litter cleaning system in accordance with claim 6 including a chemical dispensing chamber disposed in the container below the second opening.

9. The readily cleanable litter cleaning system in accordance with claim 1 including a handle positioned on the container.

* * * * *